United States Patent [19]

Linder

[11] 3,884,548

[45] May 20, 1975

[54] VARIABLE OPTICAL WEDGE FOR IMAGE STABILIZATION AND OTHER PURPOSES

[75] Inventor: Solomon L. Linder, St. Louis, Mo.

[73] Assignee: McDonnell Douglas Corporation, St. Louis, Mo.

[22] Filed: Feb. 21, 1973

[21] Appl. No.: 334,260

[52] U.S. Cl. ............ 350/16; 350/175 VP; 350/286
[51] Int. Cl. ............................................. G02b 5/04
[58] Field of Search ................ 350/16, 286, 175 VP

[56] References Cited
UNITED STATES PATENTS

| | | | |
|---|---|---|---|
| 3,253,525 | 5/1966 | Merkel | 350/16 UX |
| 3,378,326 | 4/1968 | Alvarez | 350/16 |
| 3,531,176 | 9/1970 | Humphrey | 350/16 |

Primary Examiner—Ronald L. Wibert
Assistant Examiner—Matthew W. Koren
Attorney, Agent, or Firm—Charles B. Haverstock

[57] ABSTRACT

A variable optical wedge or prism device for stabilizing optical systems and for other purposes, said device being applicable for use with various optical devices and systems including use with telescopes, binoculars, spectroscopy devices, and other optical devices and instruments. The subject wedge or prism includes in its simplest form two relatively movable optical wedge forming members both of which are plano-spherical lenses. The present optical wedge concept may also be embodied as part of other optical elements, in which case the basic members may take another form as disclosed.

10 Claims, 7 Drawing Figures

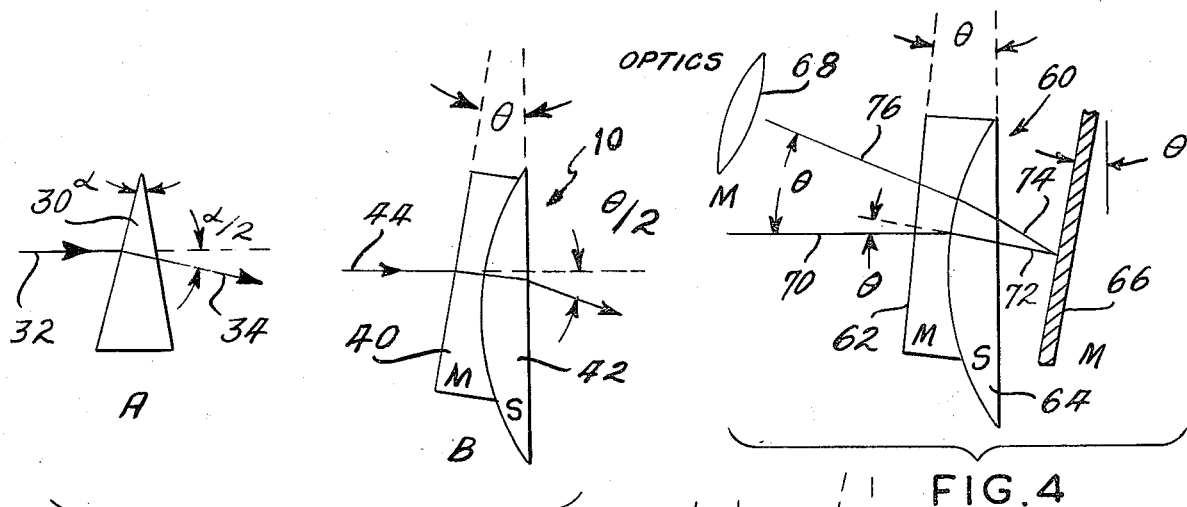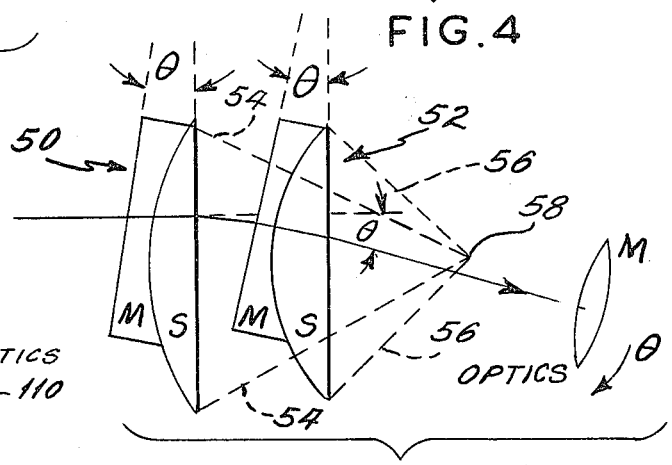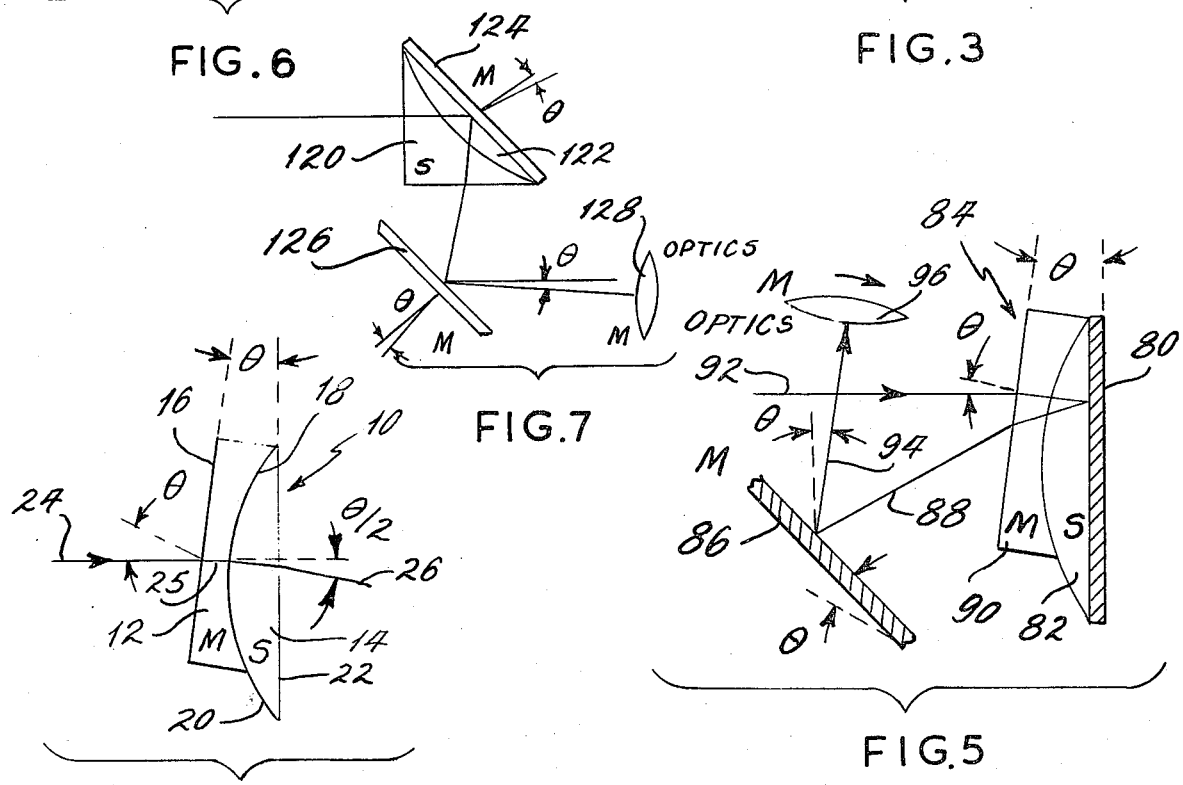

VARIABLE OPTICAL WEDGE FOR IMAGE STABILIZATION AND OTHER PURPOSES

In an optical system, rotation of the system through some angle usually results in an apparent image motion which is equal but opposite in sense to the angle of rotation of the system. This apparent motion may be objectionable. If a stabilized mirror is employed and is accurately located in such a movable optical system there will be overcompensation for the image motion because the mirror has the property of deviating a light beam through an angle that is twice the angle of rotation of the system relative thereto. Various schemes and devices have been used to try to overcome this and other limitations and shortcomings of optical systems and to stabilize such systems. One such proposal is to float a stabilizing device in a liquid medium so that a lag is introduced into mirror motion. In such a case, the lag is chosen so that the mirror rotation is equal to half the rotation of the optical system, thus compensating for the apparent image rotation by a factor to two. In another known system, image relay means have been used which are constructed to introduce a demagnification factor of two to accomplish the same purpose. These and other known means for stabilizing an optical system have certain disadvantages and shortcomings including being difficult to combine with many known optical devices and systems. For these and other reasons, the known stabilization means are unsuitable for many applications. The known stabilizing means also unduly complicate the basic optical system on which they are used to such an extent that they further limit their usefulness and application.

The present invention overcomes these and other shortcomings and disadvantages of the known prior art optical stabilizers and by means and technology that involve relatively straight forward optical principles and techniques. The present means can be used for many purposes including any purpose where apparent image motion is objectionable and thus can include, for example, overcoming human jiggle and motion when observing an image through an optical device such as through binoculars or telescopes. In addition to being useful for stabilizing apparent image motion, the subject means can also be used to stabilize transmitted energy or light including transmitted coherent and incoherent light beams, it can be used on devices such as optical guidance devices, trackers, seekers, laser beams, direction control devices, and any other image observing or light transmitting devices. It can also be used on spectrascopes and spectroscopy devices to control or monitor the apparent image motion to observe or monitor certain wavelengths. Many other uses and applications which depend on stabilizers or merely stabilizing light images are also possible and will be suggested by the detailed description of several selected embodiments which follow.

It is, therefore, a principal object of the present invention to provide relatively simple means for stabilizing optical devices and the images involved therewith including optical devices used for observing images and for emitting images or radiations.

Another object is to provide relatively lightweight and inexpensive optical stabilization means particularly suitable for accurately and completely compensating for apparent movements or deviations of optical images.

Another object is to provide means to compensate for apparent image motions due to angular rotations and other movements of optical systems.

Another object is to provide improved and more stable optical seeking and beam direction control means.

Another object is to facilitate optically coupling lenses and lens systems to inertially stabilize them and to compensate for apparent movements of objects or images being observed thereby.

Another object is to provide means to compensate optical systems so that light or other radiations from remote locations will appear to enter at an apparent undeviated angle regardless of angular movements of the system.

Another object is to provide means to maintain the direction of emitted radiation regardless of movements of the optical system from which the radiations are being emitted.

Another object is to provide means that can be incorporated into optical systems to improve the optical characteristics thereof and can compensate for undesirable aberrations that may exist.

Another object is to provide means that can be used to provide accurately controlled apparent angular movements of observed images and radiations.

Another object is to provide means for more accurately and controllably monitoring a band of wavelengths in a spectrum.

These and other objects and advantages of the present invention will become apparent after considering the following detailed specification which discloses several embodiments of devices and systems incorporating variable optical wedges in conjunction with the accompanying drawing, wherein:

FIG. 1 is a cross-sectional view taken through a variable wedge device constructed according to the present invention;

FIGS. 2A and 2B are cross-sectional views taken respectively through a non-variable and a variable optical wedge comparing certain optical characteristics of each;

FIG. 3 shows a construction wherein two variable optical wedges similar to the variable wedge in FIG. 1 are coupled optically for movement in concert with each other in an optical system;

FIG. 4 shows a construction wherein a variable wedge similar to that shown in FIG. 1 is used in an optical system in combination with a mirror;

FIG. 5 shows a variable optical wedge device being used in a system in combination with two mirrors;

FIG. 6 shows another modified form of the invention wherein the subject means are incorporated for use with another form of optical prism; and, FIG. 7 is a view similar to FIG. 6 but with a different arrangement of the stabilized and movable members.

Referring to the drawing more particularly by reference numbers, number 10 in FIG. 1 refers to a so-called variable wedge optical device constructed according to the present invention. The variable wedge 10 is formed by two adjacent optical elements including a plano-concave lens element 12 and a plano-convex lens element 14. In FIG. 1, the lens element 14 is considered to be stabilized (S) and therefore fixed in space. Various means can be used to stabilize the non-movable members including anchoring them to some fixed object but more probably and more practically stabilizing them internally by means of a gyro or like device (not shown).

The lens 12, on the other hand, is considered to be movable (M) and has a plane or flat surface 16 on one side and a concave curved surface 18 on its opposite side. The member 14 has its convex surface 20 formed on the side which is adjacent to the lens 12 and an opposite plane surface 22. The surfaces 18 and 20 have the same curvature and are positioned to be adjacent or in contact with each other as shown. When a light ray such as the light ray 24 impinges on the flat or plano surface 16 of the element 12 it passes through the lens 12 depending on the direction or angle of incident thereof relative to the surface 16. The direction in which the ray 24 travels through the lens 12 is also controlled by the index of refraction to the material in the lens 12. Thereafter, when the refracted ray 25 reaches the concave surface 18 it will enter the lens 14 at the convex surface 20 and at some other angle of incidence relative thereto. The ray will then pass through the lens 14, again being controlled as to direction by the angle of incidence of the incoming ray at the point where it reaches the convex surface 20 and the index of refraction of the material in the lens 14. The exiting ray is indicated at 26 and its location and direction are determined by the factors already specified including the angle of incidence at entry and the index of refraction of the elements 12 and 14. It should also be recognized that the positions and the movability of the lenses 12 and 14 can be reversed without departing from the basic principles.

The ray 24 may be a ray of ordinary light, it may be a ray of monochromatic or coherent light, and it may be part of a spectrum. If the light ray 24 moves through an angle designated as the angle $\theta$ in FIG. 1 with respect to the flat surface 16 of the element 12, the output ray 26 should not change its direction if the system in which the present device is used is stabilized. This can be demonstrated by showing that the direction of the incident ray 24 as it passes through the variable wedge 10 will be changed by an angle equal to $(n-1)\theta$ with respect to the entering direction of the incident ray 24. In this expression n is the index of refraction of the lens elements 12 and 14. If both elements 12 and 14 are made of a particular type of optical glass, such as one where $n$ equals 1.5, the exiting light ray 26 will have an angular direction with respect to the incoming ray 24 of $\theta/2$. This is indicated in FIG. 1 where the incoming ray 24 as stated is shown as subtending the angle $\theta$ while the exiting ray 26 is moving through an angle $\theta/2$. By appropriate combinations of lenses and lens characteristics for use in the subject variable wedge 10, the wedge can be constructed to produce other angular relationships established between an input and an output ray. Furthermore, for relatively small angular movements of the incoming ray including angular movements where $\theta$ in radians is equal or approximately equal to the sine of $\theta$, there will be little or no apparent movement of the output. This is highly desirable and is especially useful for devices which follow or track objects or projectiles and for many other applications as well. This principle can also be made use of to remove or eliminate jiggle such as human jiggle when holding a pair of binoculars or a telescope.

Again referring to FIG. 1 it is assumed that the member 14 is stabilized or stationary relative to the optical system in question while the member 12 moves therewith. In an unstabilized optical system, rotation of the system relative to a source of light or vice versus through some angle will, as indicated, result in an apparent, often objectionable, image motion and the amount of this apparent image motion is equal and opposite to the movement or angle of rotation of the optical device itself. If a stabilized mirror is placed in such an optical system, it will over-compensate for the apparent image motion since mirrors have the property of deviating a light beam through an angle that is equal to twice the angle of rotation of the mirror or twice the angle of rotation of an image being reflected thereby. The present optical prism or wedge can overcome this limitation of mirrors in a variety of ways as will be explained hereinafter. In the discussion that follows the angular deviations that can be compensated for to stabilize the system are relatively limited as indicated above, but within the range of possible error compensation, the present means can be made to be very accurate and can produce very stable operating conditions.

In FIG. 2A a thin single element prism or wedge 30 having a relatively small wedge angle $\alpha$ is shown for comparison purposes with the variable wedge 10 in FIG. 2B. The single element prism 30 is sometimes referred to as an "optical wedge." It can be shown that the deviation of parallel light rays entering the prism 30 as ray 32, and exiting the prism as ray 34 has an angular deviation between the entering and exiting rays that can be represented by the expression $D = (n-1)\alpha$, where $D$ is the angular deviation between the rays 32 and 34, n is the index of refraction of the optical wedge 30, and $\alpha$ is the apex angle of the wedge 30. If the wedge member 30 is formed of a good quality of optical glass haaving an index of refraction equal exactly to 1.5, then the deviation angle $D$ will be equal to half of the apex angle $\alpha$, or $D = 0.5\alpha$. This result is independent of the angle of incidence of the entering light ray 32 relative to the face of the wedge 30. In other words, the angle between the exiting light ray or rays 34 and a line parallel to the entering light ray or rays 32 will be equal to one half of the apex angle of the wedge or $\alpha/2$. For wedges constructed of materials having refractive indexes that are different from 1.5, the angular deviations produced will vary from that shown in FIG. 2A.

The construction shown in FIG. 2B is a variable wedge device similar to that shown in FIG. 1 and includes a plane-concave lens 40 and a plane-convex lens 42, the curved surfaces of which have the same radius of curvature and are adjacent or in surface-to-surface contact. If one of the elements, for example the plano-concave lens 40, moves with an associated optical system that receives incident light 44, and if the other or convex lens 42 is inertially stabilized, then any rotations of the optical system including the lens 40 through some angle such as the apex angle $\alpha$ of the wedge shown in FIG. 2A can be partially or totally compensated for by an amount equal to the angle $\alpha/2$, as aforesaid. In the case of the variable wedge shown in FIGS. 1 and 2B the variable wedge angles are shown as the angle $\theta$ instead of $\alpha$, and with the variable wedge the angle $\theta$ changes with movements of the movable portion thereof and with corresponding movements of the associated optical elements.

If two of the subject variable wedge devices 50 and 52 are placed in optical series with each other as shown in the construction of FIG. 3, then complete compensation of the output is possible for any angular variations in the direction of the incoming or observed rays assuming as in the above cases that the index of refraction of all of the optical elements or lenses involved is exactly equal to 1.5, and also assuming that the angular movements involved are relatively small. Furthermore, the curved surfaces of the lenses used in the two variable wedges 50 and 52 of FIG. 3 must be so constructed and located that their centers of curvature are located at the same point in space. This is shown in the drawing by the dotted radius lines 54 and 56 (which intersect at point 58). With the centers of the two wedges at the same location, the two movable portions of the wedges 50 and 52 can be constrained to move together as an assembly with the optical means or system associated therewith. This obviously is an important practical consideration not only because it provides means to fully compensate for angular deviations but also because it makes it possible to more easily construct and incorporate such a stabilizing means for use with an existing optical system. In this case, the point in space where the radii intersect, namely the point 58, is the "center of rotation" as well as the center of curvature for the combined compensation means. In this embodiment as in the others the inertially stabilized lens members are labeled S and the movable lens members are labeled M. The means for inertially stabilizing certain of the members as aforesaid can be an attachment to a fixed structure, gyro means and so forth.

In the construction shown in FIG. 3, as well as in those that will be described later, it is assumed that the index of refraction of the material used in the lenses involved is exactly 1.5. If it should be otherwise, then the fractional error produced will be directly proportional to the value of the expression $(n - 1.5)$. Also, as the wedge angle becomes relatively large, above about 8°, the deviations or errors which manifest themselves as apparent image movements become functions of the angle of incidence of the incoming light rays as well as functions of $(n - 1.5)$. Therefore, the smaller the apex angle of the wedge the more accurate will the results be, and the deviation angles will be more nearly directly proportional only to the wedge angle for variations in the angle of incidence. This condition holds true to the extent that the sine of the angle of incidence can be replaced directly by the radian measure of the angle. As this substitution becomes less true, the deviations become larger and variations in the angle of incidence have a greater effect on the accuracy of the results obtained.

FIG. 4 shows an embodiment of the subject device which makes use of the same basic concepts and principles set forth above but in a system that includes a mirror. In FIG. 4, the variable wedge 60 is formed by wedge members 62 and 64 as in the above cases, but in this case the wedge 60 is combined for use with mirror 66 which is movable with the optical system to be stabilized, which system includes the condenser or objective lens 68. The wedge angle $\theta$ in this construction is the same angle as in the other constructions and this angle also establishes the angular orientation of the mirror 66 relative to the plane surface of the wedge lens 64. The incoming light ray or rays 70 impinge on the plane surface of the movable wedge lens element 62 passing through the element and also through the other wedge lens element 64 as described above so that the exiting ray or rays 72 impinge on the mirror 66. The mirror 66 reflects the impinging rays 72 back to a different location on the plane surface of the stabilized wedge element 64, and these reflected rays 74 then pass through the variable wedge 60 in a reverse direction exiting therefrom as the observed or output rays 76. The exiting rays 76 are directed to the optical means indicated in FIG. 4 by the condenser lens 68. Movements of the light rays 70 that pass through the stabilizing means shown in FIG. 4 are stabilized so as to appear to enter the optical system at an apparently undeviated angle. The proof that this is so is that the net line-of-sight rotation or angular movement of $\theta$ when the index of refraction $n$ of the lenses is 1.5 is straight forward and can be explained using the same equations and reasoning expressed above. Note for example, that the rays 72 are oriented at an angle of $\theta/2$ with respect to the rays 70 and that the rays 70 and 76 are oriented at an angle of $\theta$ with respect to each other.

The construction shown in FIG. 5 differs from the construction shown in FIG. 4 in several important ways including the fact that it employs two mirrors instead of only one. In the FIG. 5 construction, mirror 80 is positioned on or adjacent to the plano surface of the plano-convex lens 82 of the variable wedge 84, and the second mirror 86 which is movable with the optical system is positioned to receive and reflect the rays 88 which exit from the plane surface of the plano-concave lens 90 in the variable wedge 84. The entering light rays 92 from some remote source pass through the wedge 84 in the same manner previously described for the other constructions except that in this case the rays are reflected by the mirror 80 immediately at the output side of the wedge and pass back through the wedge exiting as the output rays 88. The exiting rays 88 are directed at and reflected by the other mirror 86 and are identified in the drawing as rays 94. The rays 94 are directed toward an optical system represented in FIG. 5 as the condenser lens 96 which is part of the movable means.

In the FIG. 5 construction, as in the others, the angle $\theta$ is the variable apex angle of the wedge element 84 and is the same angular orientation $\theta$ through which the mirror 86 moves to maintain the optical system as represented by the lens 96 in position to follow the light source 92 as it moves relative to the subject system. As the angular orientation of the incoming rays 92 move relative to the wedge 84 through angle $\theta$ the output or exiting rays, which are the rays 94, remain directed at the optical system. This is illustrated by showing that while the incoming rays move through an angle $\theta$ relative to the plane surface of the plano-convex lens 82 and the mirror 80, the variable wedge lens 90, the mirror 86 and the lens 96 move through the same angle $\theta$. In the drawings the angles and curvatures have been exaggerated sometimes for the sake of clarity.

In the normal or "no-deviation" arrangement of the subject variable wedge assembly, the assembly can be considered as being equivalent to a glass plate. The aberrations of such devices are well known and can be compensated for by proper design of the components including the components of the optical system. The aberrations referred to approach or become zero in the case of a parallel beam impinging at a normal angle of incidence to the glass plate. However, as the wedge angle $\theta$ increases a net so-called thin wedge effect results in the production of other aberrations and this occurs even when the wedge is positioned in a parallel beam or ray. The other aberrations referred to are the chromatic aberrations and astigmatism.

The chromatic aberrations or effects of a prism can be represented by the rate of change of the index of refraction $n$ with changes in the wavelengths of the involved radiations. For a combination of thin prisms with deviations such as those mentioned before, the relative change $\Delta D$ in deviation angle $D$ can be expressed by the equation:

$$\Delta D/D = \Delta n/n - 1$$

where, $\Delta n$ represents the spread or variation of the index of refraction for the wavelength range of interest, and, $\Delta n/n - 1$ is an expression which represents the dispersive power of the device which is also represented as $1/\nu$.

For glass that has an index of refraction about 1.5, the dispersive power is equal to about 1/65, and for this situation there will be a color spread of about 1.5 percent of the deviation angle. The human eye can resolve an angular variation or spread of about 0.5 milliradian. This means that for a 5 power telescope, there will be about 0.1 milliradian apparent field angle, so that the chromatic effects will become noticeable at about 0.1 × 65 or at about 6.5 milliradians of static deviation. In dynamic operations, when the system or image is in motion, the maximum allowable deviation should be even greater.

The astigmatic effects of the thin wedge will in general result in different focal planes for the components of the image along and normal to the deviation. In the first approximation, this will result in an apparent foreshortening of the image in one dimension. If this effect becomes objectionable when the dimensions decreases by about 1 percent, it is equivalent to saying that it becomes objectionable when the cosine of the deflection angle equals 0.99. This condition begins to occur at an angle of about 8°. It can therefore be said that the astigmatic effects are less of a problem than the chromatic effects.

As already explained, the present variable wedge and the other optical components and systems that can be combined therewith, some of which are illustrated herein, have useful applications in many types of devices and systems including systems where even small apparent angular deviations are unacceptable. This includes systems which observe and/or respond to radiations of varying wavelengths coming from remote locations, and it also includes applications where it is desired to emit or direct outwardly going or transmitted radiations.

FIGS. 6 and 7 show other implementations of the subject device, and they differ from the embodiments discussed already because a prism element is used in combination with one element of the variable wedge. In this case, the prism structure 100 includes a movable prism member 102 which has a concave surface which cooperates with a convex surface on a stabilized member 104. The stabilized member 104 also has a mirror 106 attached thereto as shown. In this embodiment a second mirror 108 is also provided at a spaced location from the assembly 100 and the mirror 108 is also stabilized. The system of FIG. 6 also has optical means shown as lens 110 which are movable with the prism 102. In this system the imcoming light ray 112 passes through the prism member 102 and the lens member 104 and is reflected by the mirror 106 so that the reflected ray again passes through the elements 104 and 102 exiting therefrom in a direction to impinge on and be reflected by the stabilized mirror 108. The ray impinging on the mirror 108 is then directed toward the movable optical system including the lens 110. Except for the fact that the system of FIG. 6 includes a prism member in combination with the variable wedge structure it is similar and operates somewhat similar to the structures described above. It also achieves the same advantages.

FIG. 7 shows another optical system which is quite similar to the system of FIG. 6 except that in the structure of FIG. 7 the prism 120 is the stabilized member and the plano-convex lens 122 and the associated mirror 124 are movable. Also, a second mirror 126 spaced from the prism assembly is movable as are the optical means shown as the lens 128. The system shown in FIG. 7 is very similar and operates similarly to the system of FIG. 6 and achieves basically the same advantages.

The various embodiments of the subject device as disclosed in the application are shown for illustrative purposes only and do not represent or describe all possible variations of the subject invention. Furthermore, as already indicated the subject systems lend themselves to use with various forms of optical devices and systems both for the purpose of stabilizing an image received from a movable object and for stabilizing an exiting image such as a ray or beam of coherent or incoherent light directed in space or elsewhere.

Thus there has been shown and described a novel variable angle optical wedge or prism that can be used in many applications including applications for stabilizing optical systems, which wedge means fulfill all of the objects and advantages sought therefor. It will be apparent from the specification and drawing, however, that many changes, modifications, variations and other combinations and uses of the present construction are possible, and within the scope of the present invention. All such changes, modifications, variations, and other combinations and uses which do not depart from the intention and scope of the invention are deemed to be covered by the invention which is limited only by the claims which follow.

What is claimed is:

1. A variable optical prism comprising first and second wedge members, said first wedge member being a plano-concave lens member having a plane surface on one side thereof and a concave surface of radius R opposite thereto, said second wedge member being a plano-convex lens member having a convex surface of radius R opposite a plane surface, the concave surface of said first member being in surface-to-surface contact with the convex surface of the second member, said first and second members being constructed of optical glass having indexes of refraction equal to 1.5, the plane surfaces of said first and second members being oriented at an acute angle relative to each other, means for moving one of said wedge members relative to the other wedge member to change the angular relationship of the plane surfaces thereof, means for stabilizing the position of the other wedge member, objective lens means in optical communication with said optical prism, said objective lens means being connected for movement in concert with the movable wedge member, and a mirror positioned in the path of the light exiting from said optical prism, said mirror reflecting the exiting light back to a different position on the optical prism whereby the reflected light enters and passes back through the prism in an opposite direction from the exiting light, and means connecting the mirror to the plane surface of the movable wedge member for movement in concert therewith.

2. In an optical system including means for receiving light from a remote source and directing light in a predetermined direction comprising means to stabilize the light in said predetermined direction regardless of changes in the position of the observed light source comprising an optical wedge including first and second adjacent wedge members, said first wedge member being a plano-concave lens element having a plane surface facing in the direction of the remote light source and an opposite concave surface having a radius of curvature equal to R, said second optical wedge member being a plano-convex lens element having a convex surface with a radius of curvature equal to R and an opposite plane surface, said convex surface being positioned adjacent to the concave surface of the first lens element, means to stabilize the position of one of said lens element, means for moving the other lens element relative thereto, optical means including lens means connected for movement in concert with the movable lens element, movements of said lens means and of the movable lens element to follow movements of the remote light source having relatively little effect on the position of the light exiting in the predetermined direction, and a second optical wedge similar to the aforesaid optical wedge positioned between the aforesaid optical wedge and the optical means, said second optical wedge having a first plano-concave lens element, the concave surface of which has a radius of curvature greater than R and selected so that the center of curvature coincides with the center of curvature of the concave and convex surfaces of the aforesaid first and second wedge members, and a plano-convex lens having a convex surface positioned in surface-to-surface contact with the concave surface of the said first member of said second optical wedge and means for connecting a corresponding one of the wedge elements of said first and second optical wedges and the lens means for movement in concert.

3. In an optical system including means for receiving and passing light from a remote source including directing exiting light in a predetermined direction therefrom regardless of changes in the position of the observed light source comprising an optical wedge including first and second adjacent wedge members, said first wedge member being a plano-concave lens element having a plane surface facing in the direction of the remote light source and an opposite concave surface having a radius of curvature equal to R, said second optical wedge member being a plano-convex lens element having a convex surface with a radius of curvature equal to R and an opposite plane surface, said convex surface being positioned adjacent to the concave surface of the first lens element, mirror means associated with the plane surface of one of said lens elements to reflect light exiting therefrom back through the optical wedge, means to stabilize the position of one of said lens elements, and means for moving the other lens element relative thereto, optical means including objective lens means, means connecting the objective lens means to the movable lens element for movement in concert therewith, movement of said optical means including the objective lens means and of the movable lens element to follow movements of the remote light source having relatively little effect on the position of the light exiting in the predetermined direction.

4. Means to stabilize an output optical image regardless of movements of the source comprising an optical wedge formed by first and second adjacent wedge members, said first wedge member including a plano-concave lens element having a plane surface on one side and a concave surface of radius R on the opposite side thereof, the second wedge member including a plano-convex lens element having a convex surface of radius R positioned adjacent to the concave surface of the first element and an opposite plane surface, mirror means mounted on the plane surface of one of said lens elements, a second mirror spaced from the optical wedge on the opposite side thereof from the aforesaid mirror means, an optical system including objective lens means spaced from said second mirror such that incident light impinging on one of the plane surfaces of the optical wedge member passes through the optical wedge and is reflected by the mirror means and passes back therethrough, said reflected light exiting from said wedge toward said second mirror and being reflected thereby to the objective lens means, means connecting one of said wedge elements to the second mirror and to the objective lens means for movement thereof in concert, and means for stabilizing the other wedge element and the mirror means attached thereto, said connected movable members being movable to maintain the exiting light stabilized on the objective lens means.

5. The means defined in claim 4 wherein said first and second wedge members are formed of a light conducting material having an index of refraction equal to 1.5.

6. In an optical system, means for minimizing movements of output light from a remote source resulting from movements of the source, the improvements comprising an optical wedge including first and second adjacent wedge elements, said first wedge element including a plano-concave lens having opposed plane and concave surfaces, the concave surface having a radius of curvature of R, the second wedge element including a plano-convex lens wherein the convex surface thereof has a radius of curvature of R and is positioned adjacent to the concave surface of the first element, light from the remote source entering the optical wedge at the plane surface of one of the wedge elements passing through the optical wedge and exiting at the plane surface of the other wedge element, a mirror positioned in spaced relationship to the plane surface of the wedge element from which the light exits in position to receive and reflect the exiting light back to the optical wedge, said reflected light passing back through the optical wedge and exiting therefrom at a different location than where the light from the source enters the wedges, optical lens means spaced from said optical wedge in position to receive the exiting reflected light, means connecting the mirror, the said one wedge element, and the optical lens means together for movement in concert with each other, and means for inertially stabilizing the said other wedge element.

7. In the optical system defined in claim 6, said first and second wedge elements are constructed of optical glass having an index of refraction equal to 1.5.

8. Means for stabilizing an optical image produced by an object irrespective of movements of the image and irrespective of movements of components of the optical system relative to one another within limits, said means comprising a variable optical prism device including adjacent first and second relatively movable prism members, said first prism member including a lens member having a convex surface, said second prism member being a lens member having a concave surface of the same radius of curvature as the convex surface of the first prism member, said convex and said concave surfaces of said first and second prism members respectively being positioned adjacent to each other, one of said prism members having a pair of angularly related plane surfaces positioned thereon opposite from the adjacent concave and convex surfaces and the other of said prism members having a plane surface thereon forming the opposite side of the optical prism device from the pair of angularly related plane surfaces, means for moving one of said prism members relative to the other to change the angular orientation of the plane surfaces thereon, and means for stabilizing the other of said prism members.

9. The means defined in claim 8 wherein one of the pair of angularly related plane surfaces on said one prism member is oriented to face in the direction of the image to be observed, and mirror means associated with the plane surface of the other prism member in position to reflect light impinging thereon back through the prism device toward the other plane surface of the aforesaid one prism member, and secondary mirror means and objective lens means positioned to receive the light exiting from the said other plane surface.

10. The means defined in claim 9 wherein said movable prism member is connected for movement in concert with the objective lens means.

* * * * *